US012487551B2

(12) United States Patent
Park et al.

(10) Patent No.: US 12,487,551 B2
(45) Date of Patent: Dec. 2, 2025

(54) DEVELOPING DEVICE WITH STRUCTURE TO REGULATE DISCHARGING AMOUNT OF DEVELOPER

(71) Applicant: Hewlett-Packard Development Company, L.P., Spring, TX (US)

(72) Inventors: Jonghyun Park, Seongnam Si (KR); Jonghwa Park, Seongnam Si (KR); Hojin Jang, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/565,811

(22) PCT Filed: Oct. 7, 2021

(86) PCT No.: PCT/US2021/071758
§ 371 (c)(1),
(2) Date: Nov. 30, 2023

(87) PCT Pub. No.: WO2022/271198
PCT Pub. Date: Dec. 29, 2022

(65) Prior Publication Data

US 2024/0361721 A1 Oct. 31, 2024

(30) Foreign Application Priority Data

Jun. 22, 2021 (KR) ........................ 10-2021-0081073

(51) Int. Cl.
*G03G 21/10* (2006.01)
*G03G 15/00* (2006.01)
*G03G 15/08* (2006.01)

(52) U.S. Cl.
CPC ......... *G03G 21/10* (2013.01); *G03G 15/0806* (2013.01); *G03G 15/0844* (2013.01);
(Continued)

(58) Field of Classification Search
CPC ............... G03G 21/10; G03G 15/0806; G03G 15/0893; G03G 15/556; G03G 15/0891;
(Continued)

(56) References Cited

U.S. PATENT DOCUMENTS 7,860,435 B2 * 12/2010 Aimoto .............. G03G 15/0822 399/256
2004/0179865 A1 * 9/2004 Nishiyama ......... G03G 15/0893 399/254
(Continued)

FOREIGN PATENT DOCUMENTS

JP 2005-092059 A 4/2005
JP 2010-044381 A 2/2010
(Continued)

*Primary Examiner* — Stephanie E Bloss
*Assistant Examiner* — Laura Roth
(74) *Attorney, Agent, or Firm* — Foley & Lardner LLP

(57) ABSTRACT

A developing device includes a conveying member to circulate a developer in a housing, a developer discharge portion extending from one end portion of the housing to form a passage through which surplus developer is discharged from the housing, and a discharge regulation member located on an upstream side of the developer discharge portion with respect to a direction in which the developer is conveyed to the developer discharge portion by the conveying member to partially block a conveying path of the developer. The discharge regulation member includes a lower end portion and an upper end portion arranged apart from a bottom and an upper wall of the conveying path, respectively.

16 Claims, 13 Drawing Sheets

(52) U.S. Cl.
CPC ....... *G03G 15/0893* (2013.01); *G03G 15/556* (2013.01); *G03G 15/0891* (2013.01); *G03G 21/105* (2013.01); *G03G 2215/083* (2013.01); *G03G 2215/0838* (2013.01); *G03G 2221/1624* (2013.01)

(58) Field of Classification Search
CPC ....... G03G 15/0849; G03G 2215/0827; G03G 21/105; G03G 2215/083; G03G 15/0889; G03G 15/0844; G03G 2215/0838; G03G 2221/1624
See application file for complete search history.

(56) References Cited

U.S. PATENT DOCUMENTS

| | | | | |
|---|---|---|---|---|
| 2006/0239720 | A1 | 10/2006 | Hirota et al. | |
| 2009/0310985 | A1* | 12/2009 | Hirata ................ | G03G 15/0887 399/30 |
| 2011/0229209 | A1 | 9/2011 | Takaya et al. | |
| 2015/0030354 | A1* | 1/2015 | Ishida ................ | G03G 15/0921 399/254 |
| 2015/0139696 | A1* | 5/2015 | Ishida ................ | G03G 15/0893 399/254 |
| 2015/0323886 | A1 | 11/2015 | Mandai et al. | |
| 2016/0259269 | A1* | 9/2016 | Tanaka ............... | G03G 15/0891 |
| 2016/0370734 | A1* | 12/2016 | Suenami ............ | G03G 15/0893 |
| 2017/0060031 | A1* | 3/2017 | Iida .................... | G03G 15/0844 |
| 2019/0187588 | A1* | 6/2019 | Suzuki ............... | G03G 15/0893 |
| 2019/0361374 | A1 | 11/2019 | Nieda | |
| 2020/0166872 | A1 | 5/2020 | Kita et al. | |
| 2020/0174399 | A1 | 6/2020 | Ohkubo et al. | |
| 2020/0192247 | A1* | 6/2020 | Park ................... | G03G 15/0844 |
| 2021/0149326 | A1* | 5/2021 | Abe ................... | G03G 15/0879 |
| 2022/0373930 | A1* | 11/2022 | Igawa ................ | G03G 15/0891 |

FOREIGN PATENT DOCUMENTS

| | | | | |
|---|---|---|---|---|
| JP | 2018200397 | A * | 12/2018 | |
| JP | 2019109359 | A * | 7/2019 | ......... G03G 15/0893 |
| JP | 6659177 | B2 | 3/2020 | |

* cited by examiner

DEVELOPING DEVICE WITH STRUCTURE TO REGULATE DISCHARGING AMOUNT OF DEVELOPER

CROSS-REFERENCE TO RELATED APPLICATIONS

This application is a U.S. National Stage Patent Application under 35 U.S.C. § 371 of PCT/US2021/071758, filed Oct. 7, 2021, which claims priority to Korean Patent Application No. 10-2021-0081073, filed Jun. 22, 2021, which are hereby incorporated by reference in their entireties.

BACKGROUND

An electro-photographic image forming device forms a visible toner image on a photoconductor by supplying a toner to an electrostatic latent image formed on the photoconductor, transfers the toner image onto a printing medium, and fuses the transferred toner image on the printing medium to print an image on a recording medium. A developing device accommodates the toner and supplies the toner to the electrostatic latent image formed on the photoconductor to form the visible toner image on the photoconductor.

A two-component developer may include a toner and a carrier. The developing device accommodates a developer, and supplies the toner in the developer to the electrostatic latent image formed on the photoconductor. An amount of the developer in the developing device is to be maintained at an appropriate level. An automatic developer replenishment (ADR) type developing device maintains the amount of the developer in the developing device at an appropriate level by discharging surplus developer from the developing device.

DETAILED DESCRIPTION

Figure 1:
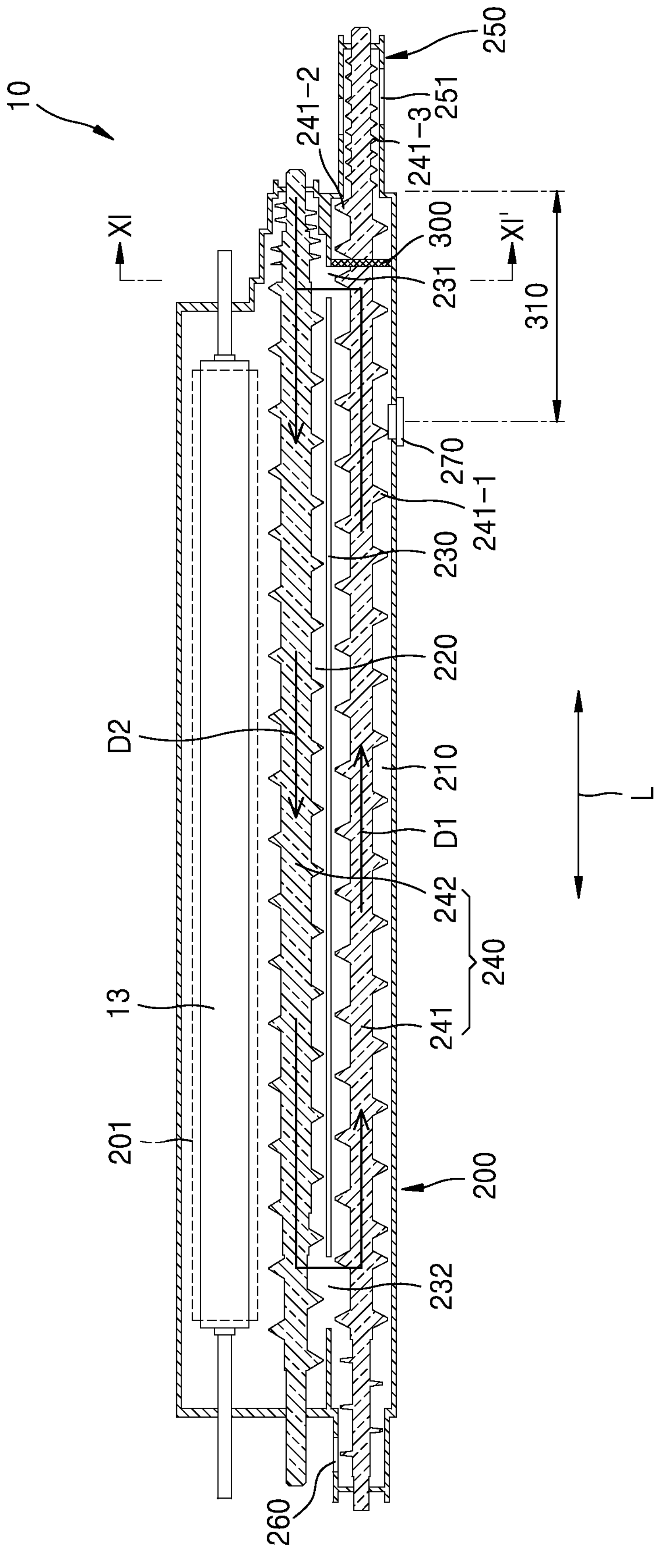
FIG. 1 is a schematic plan configuration diagram of a developing device, according to an example.

An electro-photographic image forming device may print an image on a printing medium by using a two-component developing method. A developer may include a toner and a carrier. The developer is accommodated in a developing device. The developing device supplies a toner in the developer to an electrostatic latent image formed on a photoconductor to develop a visible toner image on the photoconductor. An amount of the developer in the developing device is to be maintained at an appropriate level. In an automatic developer replenishment (ADR) type developing device, the developer circulates in the developing device, and surplus developer is discharged from the developing device through a developer outlet. In a case where the developer runs out, the developer is supplied from a developer container to the developing device. As a result, the amount of the developer in the developing device is maintained at an appropriate level. Discharge of the surplus developer is to be appropriately regulated. In a case where the discharge of the developer is excessive, the amount of the developer in the developing device may be insufficient, and thus, density unevenness such as auger marks may be caused on a printed image. In a case where the discharge of the developer is too small, the amount of the developer in the developing device may become excessive, which may cause problems such as developer leakage and toner scattering due to an insufficient charging amount of the toner.

In the developing device according to some examples, a developer discharge portion is provided at one end portion of a housing in which the developer is circulated. The developer discharge portion forms a discharge passage such that the surplus developer is discharged from the housing. In order to regulate the discharge amount of the developer, a discharge regulation member is provided on an upstream side of the developer discharge portion. The discharge regulation member may have a shape configured to partially block an upper path of a developer conveying path and open a lower path of the developer conveying path. The upper path and the lower path may be separated from each other, for example, with respect to a shaft of a conveying member configured to circulate the developer in the housing. For example, the discharge regulation member may be provided with a lower end portion and an upper end portion arranged apart from a bottom and an upper wall of the conveying path, respectively. Since the surplus developer may be discharged to the developer discharge portion through the lower path, under-discharge of the developer may be prevented. In addition, since the developer proceeding to the upper path is stagnated by the discharge regulation member and the developer exceeding the upper end portion of the discharge regulation member among the stagnant developer may be discharged to the developer discharge portion, excessive discharge of the developer may be prevented. Therefore, the amount of the developer in the developing device may be maintained at an appropriate level. The discharge regulation member may have a shape configured to partially block the lower path of the conveying path.

The housing may include an agitation chamber and a developing chamber separated by a partition wall and in communication with each other through first and second communication ports provided at both end portions of the partition wall. The developer may be circulated in the housing along a circulation path formed by the agitation chamber—the first communication port—the developing chamber—the second communication port by the conveying member. A developing roller may be installed in the developing chamber. The developer conveyed along the developing chamber may be attached to the developing roller to be used for development. The developer discharge portion may extend from either the agitation chamber or the developing chamber. The conveying member may include a first spiral portion (forward spiral portion) configured to convey the developer in a forward direction, and a second spiral portion (reverse spiral portion) configured to convey the developer in a reverse direction. The reverse spiral portion may be located adjacent to the developer discharge portion. The discharge regulation member may be located on an upstream side of the second spiral portion with respect to a direction in which the developer is conveyed by the first spiral portion. For example, the discharge regulation member may be located between the first spiral portion and the second spiral portion. A toner concentration sensor configured to detect toner concentration may be provided in the agitation chamber, and the discharge regulation member may be located on a downstream side of the toner concentration sensor. The discharge regulation member may be located between the toner concentration sensor and the second spiral portion. Hereinafter, examples of the developing device will be described in detail with reference to the accompanying drawings. In the present specification and the drawings, constituent elements having substantially the same functions are referenced by the same reference numerals, and thus, redundant descriptions thereof will be omitted.

FIG. 1 is a schematic plan configuration diagram of a developing device 10, according to an example. Referring to FIG. 1, the developing device 10 may include a housing 200, a conveying member 240 configured to circulate a developer in the housing 200, a developer discharge portion 250 configured to form a passage through which surplus developer is discharged from the housing 200, and a discharge regulation member 300 located on an upstream side of the developer discharge portion 250 with respect to a direction in which the developer directed toward the developer discharge portion 250 is conveyed to partially block a conveying path 310 of the developer.

The developer is accommodated in the housing 200. The developer is conveyed along a circulation path in the housing 200, in which a toner and a carrier are agitated with each other. The housing 200 may include an agitation chamber 210 and a developing chamber 220. A developing roller 13 is installed in the developing chamber 220. An opening 201 in communication with the outside is provided in the developing chamber 220. The developing roller 13 is partially exposed to the outside of the developing chamber 220 through the opening 201, and an exposed portion of the developing roller 13 faces a photoconductor (not shown). The developing roller 13 supplies the toner of the developer accommodated in the developing chamber 220 to an electrostatic latent image formed on the photoconductor through the opening 201 to develop the electrostatic latent image into a toner image. The agitation chamber 210 is separated from the developing chamber 220 by a partition wall 230. First and second communication ports 231 and 232 are respectively provided at both end portions of the partition wall 230 in a longitudinal axis L to communicate the agitation chamber 210 and the developing chamber 220.

The conveying member 240 is installed in the housing 200 to circulate the developer in the housing 200. For example, the conveying member 240 may include first and second conveying members 241 and 242 respectively installed in the agitation chamber 210 and the developing chamber 220. The first and second conveying members 241 and 242 agitate the toner and the carrier while conveying the developer in the agitation chamber 210 and the developing chamber 220, respectively, in the longitudinal axis L. The first and second conveying members 241 and 242 may be, for example, augers having spiral blades. The first and second conveying members 241 and 242 convey the developer in opposite directions. The first and second conveying members 241 and 242 convey the developer in first and second directions D1 and D2, respectively. The developer in the agitation chamber 210 is conveyed in the first direction D1 by the first conveying member 241. The developer is conveyed to the developing chamber 220 through the first communication port 231 provided in one end portion of the partition wall 230 in the first direction D1. The developer in the developing chamber 220 is conveyed in the second direction D2 by the second conveying member 242. The developer is conveyed to the agitation chamber 210 through the second communication port 232 provided in one end portion of the partition wall 230 in the second direction D2. Given such a configuration, the developer may be circulated in the housing 200 along the circulation path formed by the agitation chamber 210—the first communication port 231—the developing chamber 220—the second communication port 232. Some of the developer conveyed in the second direction D2 in the developing chamber 220 is adhered to the developing roller 13, and the toner in the developer is supplied to the photoconductor.

The developing device 10 according to the present example employs an automatic developer replenishment (ADR) method in which a new developer is supplied to the developing device 10 and the surplus developer is discharged from the developing device 10. The developing device 10 according to the present example includes a developer supply port 260 and the developer discharge portion 250 provided with a developer outlet 251. The developer is supplied from a developer cartridge (not shown) into the developing device 10, that is, the housing 200 through the developer supply port 260. For example, the developer supply port 260 may be located on an upstream side of the agitation chamber 210. For example, the developer discharge portion 250 may extend from the agitation chamber 210. The developer discharge portion 250 may extend from a downstream end portion of the agitation chamber 210 with respect to a direction in which the developer is conveyed by the first conveying member 241, that is, the first direction D1. The developer discharge portion 250 may be located outside the first communication port 231.

The first conveying member 241 may include a first spiral portion 241-1 and a second spiral portion 241-2. The first spiral portion 241-1 is, for example, a forward spiral portion configured to convey the developer in the first direction D1. The second spiral portion 241-2 is a reverse spiral portion. The second spiral portion 241-2 has a spiral direction opposite to that of the first spiral portion 241-1. The developer is conveyed in a direction opposite to the first direction D1 by the second spiral portion 241-2. The second spiral portion 241-2 may be located on a downstream side of the agitation chamber 210 with respect to the first direction D1, and may be located near the first communication port 231. The second spiral portion 241-2 may be located on a downstream side of the first communication port 231. The developer directed to the developer discharge portion 250 by the first spiral portion 241-1 is partially stagnated by the second spiral portion 241-2, and conveyed to the developing chamber 220 through the first communication port 231. Among the developer directed to the developer discharge portion 250 by the first spiral portion 241-1, the developer that exceeds a reverse conveying capacity by the second spiral portion 241-2 is conveyed to the developer discharge portion 250 through the second spiral portion 241-2. The first conveying member 241 may further include a third spiral portion 241-3. The third spiral portion 241-3 is, for example, a forward spiral portion configured to convey the developer in the first direction D1, and has the same spiral direction as the first spiral portion 241-1. The third spiral portion 241-3 is located on a downstream side of the second spiral portion 241-2 with respect to the first direction D1. The third spiral portion 241-3 may be located in the developer discharge portion 250. The third spiral portion 241-3 conveys the developer flowing into the developer discharge portion 250 through the second spiral portion 241-2 in the first direction D1 to discharge the developer through the developer outlet 251.

The developer in the housing 200 is to be maintained at an appropriate (or target) level. In a case where the developer level is extremely higher or lower than the appropriate level, the quality of a printed image may deteriorate or problems such as toner scattering may be caused. Taking such problems into account, the developing device 10 according to the some examples is provided with the discharge regulation member 300 that is located on an upstream side of the developer discharge portion 250 and configured to partially block the conveying path 310 of the developer directed toward the developer discharge portion 250. In the developing device 10 according to some examples, the developer discharge portion 250 extends from the agitation chamber 210. The conveying path 310 of the surplus developer may be a path connecting the agitation chamber 210 to the developer discharge portion 250. The conveying path 310 may partially include the agitation chamber 210. The conveying path 310 may be a region close to the developer discharge portion 250 in the agitation chamber 210.

Figure 2:
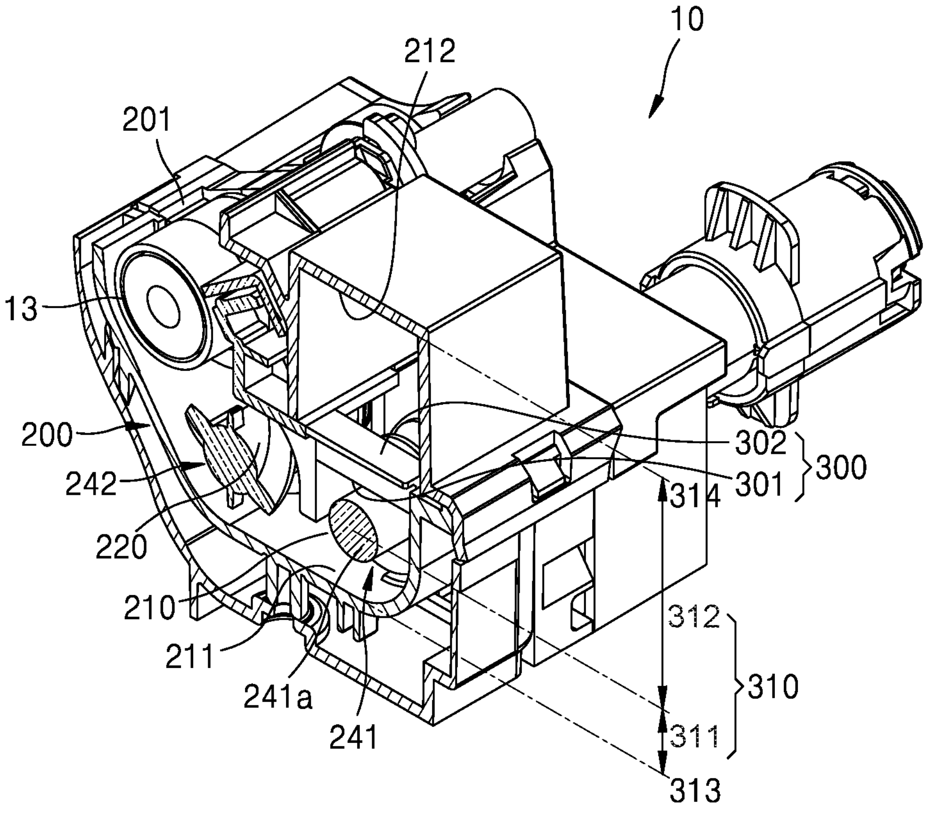
FIG. 2 is a cross-sectional view taken along a line XI-XI' of FIG. 1, and illustrates a discharge regulation member, according to an example.

FIG. 2 is a cross-sectional view taken along a line XI-XI' of FIG. 1, and illustrates the discharge regulation member 300, according to an example. Referring to FIG. 2, the discharge regulation member 300 may have a structure configured to open a lower path 311 of the conveying path 310 and partially block an upper path 312 of the conveying path 310 with respect to a shaft **241*a* of the first conveying member 241. For example, the discharge regulation member 300 may include a lower end portion 301 and an upper end portion 302 arranged apart from a bottom 313 and an upper wall 314 of the conveying path 310, respectively. The bottom 313 of the conveying path 310 may be, for example, a lower inner surface 211 of the agitation chamber 210. The upper wall 314 of the conveying path 310 may be an upper inner surface 212 of the agitation chamber 210. As an example, the lower end portion 301 may be higher than the shaft 241*a* of the first conveying member 241. The upper end portion 302 may be higher than an outer circumference of the first spiral portion 241-1 of the first conveying member 241**.

Given such a configuration, the lower path 311 may be formed between the lower end portion 301 of the discharge regulation member 300 and the lower inner surface 211 of the agitation chamber 210. The upper path 312 between the shaft **241*a* of the first conveying member 241 and the upper inner surface 212 of the agitation chamber 210 is blocked as much as an area between the lower end portion 301 and the upper end portion 302 of the discharge regulation member 300. The upper path 312 partially blocked by the discharge regulation member 300** may be formed.

The discharge regulation member 300 may be located on an upstream side of the developer discharge portion 250, for example, on an upstream side of the second spiral portion 241-2 of the first conveying member 241. The second spiral portion 241-2 is located near the first communication port 231 configured to form a circulation path of a developer from the agitation chamber 210 to the developing chamber 220 to stagnate the developer. The discharge regulation member 300 may be located on an upstream side of the second spiral portion 241-2 to further stagnate the developer on the upstream side of the second spiral portion 241-2, thereby preventing excessive discharge of the developer through the developer discharge portion 250 and allowing the developer to be easily circulated from the agitation chamber 210 to the developing chamber 220 through the first communication port 231. The discharge regulation member 300 may be located between the first spiral portion 241-1 and the second spiral portion 241-2 of the first conveying member 241. Given such a configuration, the developer may be allowed to be easily conveyed in the first direction D1 by the first spiral portion 241-1, and excessive discharge of the developer may be prevented because the developer is stagnated on the upstream side of the second spiral portion 241-2.

The developing device 10 may include a toner concentration sensor 270. The toner concentration sensor 270 is installed in the agitation chamber 210 to detect a toner concentration of the developer in the agitation chamber 210. A controller (not shown) may determine whether to supply a new developer to the agitation chamber 210 according to a detection result of the toner concentration sensor 270. In a case where the discharge regulation member 300 is located on an upstream side of the toner concentration sensor 270, the toner may be stagnant on the upstream side of the toner concentration sensor 270 by the discharge regulation member 300, thereby decreasing the reliability of the toner concentration detection. Taking such a risk into account, the discharge regulation member 300 may be located on a downstream side of the toner concentration sensor 270 with respect to a direction in which the developer is conveyed in the agitation chamber 210, for example, the first direction D1.

Figure 3:
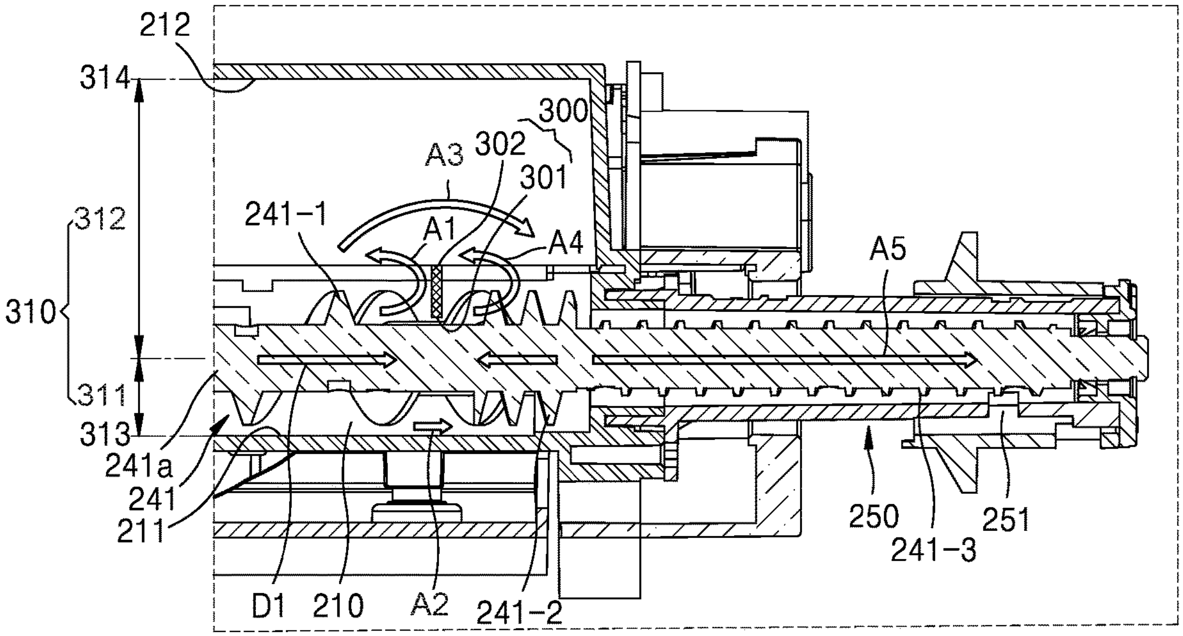
FIG. 3 is a diagram illustrating a process in which a discharge amount of a developer is regulated by a discharge regulation member.

FIG. 3 is a diagram illustrating a process in which a discharge amount of a developer is regulated by the discharge regulation member 300. Referring to FIG. 3, the developer supplied to the agitation chamber 210 through the developer supply port 260 and conveyed in the first direction D1 in the agitation chamber 210 is partially blocked, by the discharge regulation member 300, on an upstream side of the developer discharge portion 250, for example, on an upstream side of the second spiral portion 241-2 of the first conveying member 241. As indicated by reference numeral A1 near the discharge regulation member 300, developer stagnation occurs, and the developer is circulated to the developing chamber 220 through the first communication port 231. As an amount of the developer in the agitation chamber 210 increases, some of the stagnant developer is pushed toward the developer discharge portion 250 either through the lower path 311 as indicated by reference numeral A2 or through the upper path 312 through the upper end portion 302 of the discharge regulation member 300 as indicated by reference numeral A3. Some of the developer passing through the discharge regulation member 300 is returned (as indicated by reference numeral A4) to the agitation chamber 210 by stagnation of a developer formed by the second spiral portion 241-2 to be circulated to the developing chamber 220 through the first communication port 231. Of the developer passing through the discharge regulation member 300, surplus developer exceeding a reverse conveying capacity of the second spiral portion 241-2 is conveyed to the developer discharge portion 250 as indicated by reference numeral A5 to be discharged to the outside of the housing 200 through the developer outlet 251. Therefore, an amount of the developer in the housing 200 may be maintained at an appropriate level.

As a print speed of an image forming device increases, a rotation speed of the developing roller 13 may increase, and a speed and amount of air flowing into the housing 200 from the outside may increase. As a result, pressure inside the housing 200 and pressure inside the developer discharge portion 250 connected to the housing 200 may increase. A high internal pressure increases discharge speed of the developer through the developer outlet 251, so that the developer may be excessively discharged. Excessive discharge of the developer may excessively reduce the amount of the developer in the housing 200, so that the amount of the developer in the housing 200 may become insufficient. An insufficient amount of the developer may cause image defects such as a decrease in image density and auger marks. The developer whose discharge speed is increased is mainly conveyed to the developer discharge portion 250 through the upper path 312. According to the present example, the upper path 312 is partially blocked by the discharge regulation member 300. Therefore, even if the internal pressure of the housing 200 increases, excessive discharge of the developer may be prevented.

As the print speed of the image forming device becomes slower, the rotation speed of the developing roller 13 may be lowered, and the speed and amount of air flowing into the housing 200 from the outside may be decreased. The pressure inside the housing 200 and the pressure inside the developer discharge portion 250 connected to the housing 200 may decrease. In a case where the pressure inside the housing 200 and the pressure inside the developer discharge portion 250 connected to the housing 200 is decreased, the amount of the developer discharged through the developer outlet 251 may be greatly decreased, so that the amount of the developer inside the housing 200 may be greatly increased. As a result, fresh developer introduced through the developer supply port 260 may not be easily supplied to the agitation chamber 210, and thus, the performance of the developer accommodated in the housing 200 may deteriorate. Mixing of the developer in the housing 200 with the fresh developer supplied into the housing 200 through the developer supply port 260 may be insufficient, and thus, a charging amount of a toner may be decreased. Insufficiently charged toner may scatter out of the developing device 10, and may contaminate the inside of the developing device 10 and/or the image forming device. In the developing device 10 according to the some examples, since the lower path 311 of the conveying path 310 is open, even if the internal pressure of the housing 200 is low, surplus developer may be easily discharged to the developer discharge portion 250 through the lower path 311. Therefore, deterioration of the performance of the developer inside the housing 200 and scattering of the toner may be decreased.

Figure 4:
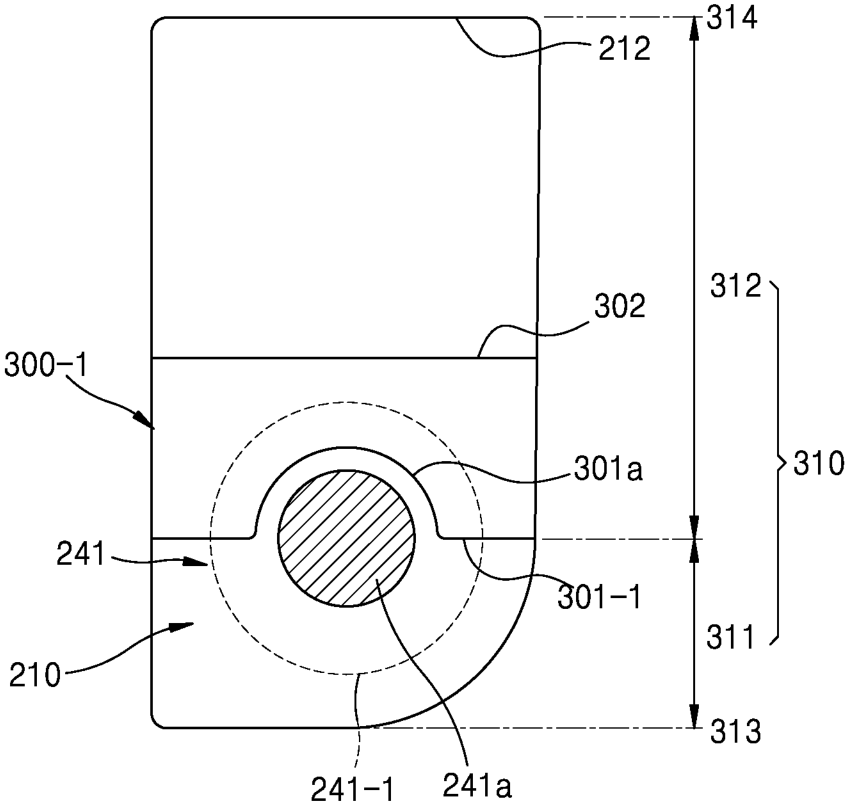
FIG. 4 illustrates a discharge regulation member, according to an example.

Shapes of the discharge regulation member 300 are not limited to the example shown in FIG. 2. The discharge regulation member 300 may have any shape as long as it is able to open the lower path 311 and partially block the upper path 312. FIG. 4 illustrates a discharge regulation member 300-1, according to an example. Referring to FIG. 4, a lower end portion 301-1 of the discharge regulation member 300-1 is generally higher than the shaft 241*a* of the first conveying member 241 and lower than an outer circumference of the first spiral portion 241-1. The lower end portion 301-1 of the discharge regulation member 300-1 may have a shape including a concave arc portion 301*a* configured to partially surround the shaft 241*a* of the first conveying member 241 from above.

Figure 5:
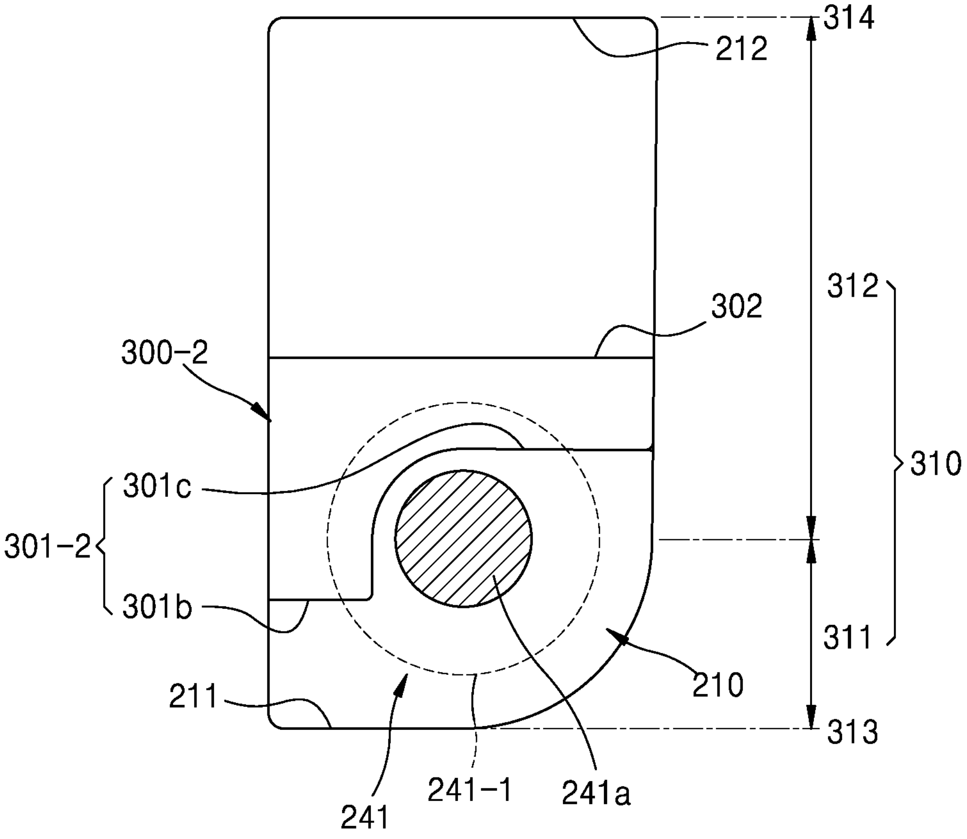
FIG. 5 illustrates a discharge regulation member, according to another example.

FIG. 5 illustrates a discharge regulation member 300-2, according to another example. Referring to FIG. 5, the discharge regulation member 300-2 according to the present example differs from the discharge regulation members 300 and 300-1 illustrated in FIGS. 2 and 4 in that the discharge regulation member 300-2 partially blocks both the lower path 311 and the upper path 312. Hereinafter, descriptions will focus on the differences thereof.

Referring to FIG. 5, the discharge regulation member 300-2 is provided with a lower end portion 301-2 arranged apart from the bottom 313 of the conveying path 310. In order to partially block the lower path 311, a portion of the lower end portion 301-2 is lower than the shaft 241*a* of the first conveying member 241. The bottom 313 of the conveying path 310 may be, for example, the lower inner surface 211 of the agitation chamber 210. The lower end portion 301-2 may be provided with a first lower end portion 301*b* lower than the shaft 241*a* of the first conveying member 241, and a second lower end portion 301*c* higher than the shaft 241*a* of the first conveying member 241. The first lower end portion 301*b* may be arranged apart from the lower inner surface 211 of the agitation chamber 210, or may contact the lower inner surface 211 of the agitation chamber 210. The second lower end portion 301*c* may be lower than an outer circumference of the first spiral portion 241-1 of the first conveying member 241. As a whole, the first lower end portion 301*b* and the second lower end portion 301*c* are arranged in a transverse direction orthogonal to a direction in which a developer is conveyed by the first conveying member 241, that is, the first direction D1, and are stepped in a vertical direction. Given such a configuration, the lower path 311 may be partially blocked by the lower end portion 301-2 of the discharge regulation member 300-2. The lower path 311 is partially blocked by a region between the first lower end portion 301*b* and the second lower end portion 301*c* of the discharge regulation member 300-2, and in a case where pressure inside the housing 200 is low, excessive discharge of the developer through the lower path 311 may be prevented.

Figure 6:
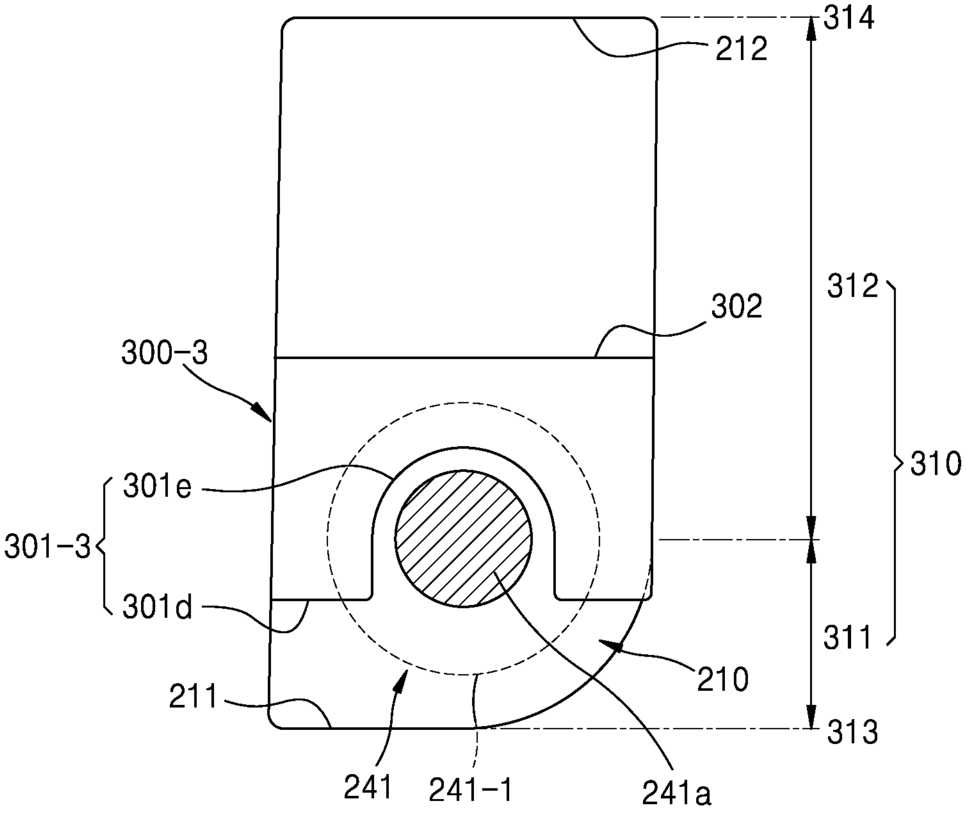
FIG. 6 illustrates a discharge regulation member, according to another example.

Shapes of the discharge regulation member are not limited to the example illustrated in FIG. 5. The discharge regulation member may have any shape as long as it is able to partially block the lower path 311 and the upper path 312. FIG. 6 illustrates a discharge regulation member 301-3, according to another example. As illustrated in FIG. 6, a lower end portion 301-3 of the discharge regulation member 300-3 may include a first lower end portion 301*d* arranged apart from the bottom 313 of a conveying area 310, that is, the lower inner surface 211 of the agitation chamber 210 and lower than the shaft 241*a* of the first conveying member 241, and a concave arc portion 301*e* recessed upward from the first lower end portion 301*d* such that the shaft 241*a* of the first conveying member 241 passes through.

Figure 7:
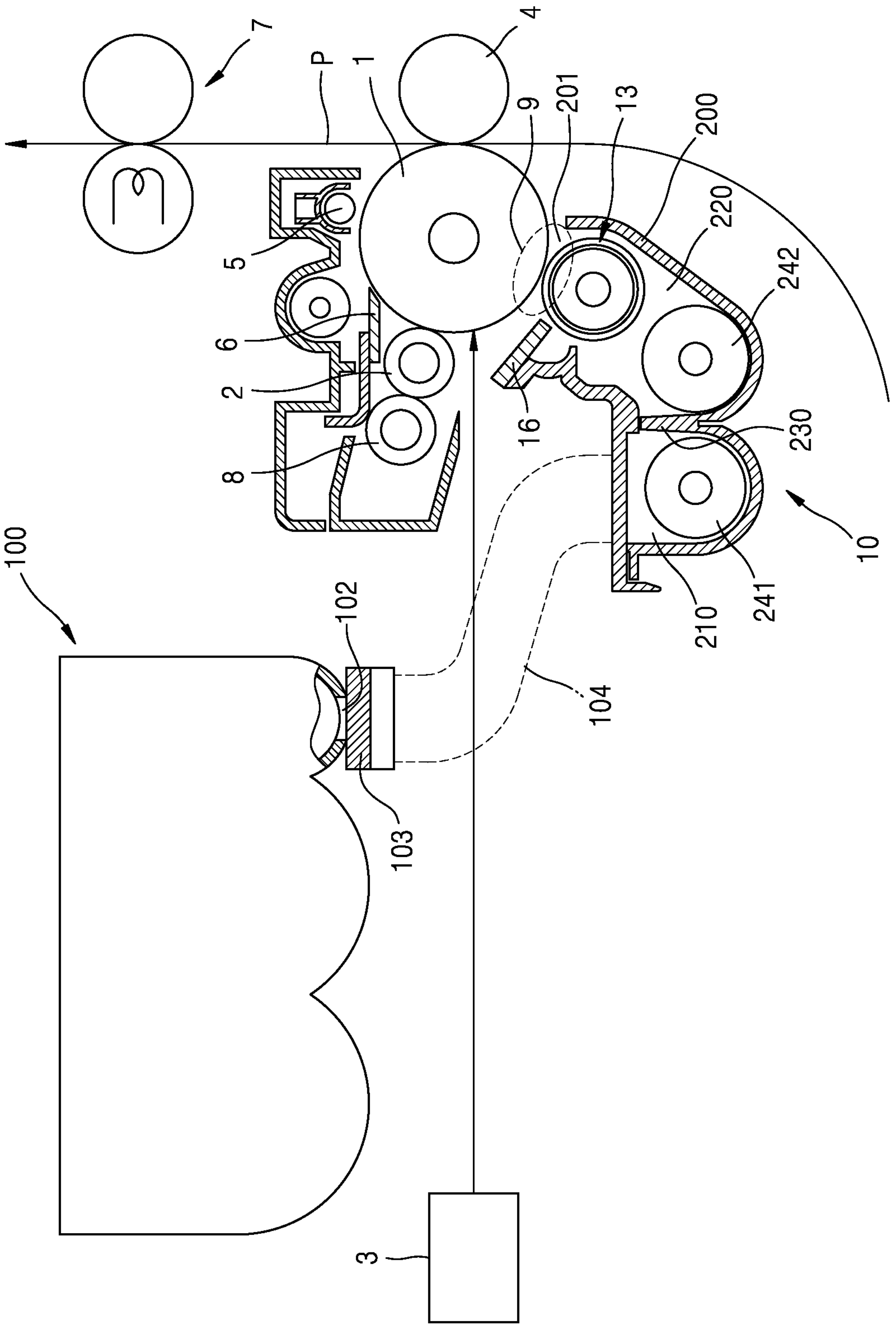
FIG. 7 is a schematic configuration diagram of an image forming device to which an example of the developing device shown in FIG. 1 is applied, according to an example.

FIG. 7 is a schematic configuration diagram of an image forming device to which the developing device 10 is applied, according to an example. The image forming device according to the present example is a monochromatic image forming device configured to employ a two-component developer including a toner and a magnetic carrier. Color of the toner is, for example, black. Referring to FIG. 7, the image forming device may include an optical scanner 3, a photosensitive drum 1, the developing device 10, a transfer device, and a fusing device 7.

The photosensitive drum 1 is an example of a photoconductor on which an electrostatic latent image is formed. A charging roller 2 is an example of a charging device configured to charge a surface of the photosensitive drum 1 to a uniform electric surface potential. The charging roller 2 contacts the photosensitive drum 1 to rotate, and a charging bias voltage is applied to the charging roller 2. A cleaning roller 8 removes foreign matters from a surface of the charging roller 2. A cleaning blade 6 removes the toner remaining on a surface of the photosensitive drum 1 after a transfer process. A static eliminator 5 configured to remove residual electric potential on the photosensitive drum 1 may be arranged on an upstream side of the cleaning blade 6 with respect to a rotational direction of the photosensitive drum 1. The static eliminator 5 may irradiate light onto the surface of the photosensitive drum 1, for example.

The optical scanner 3 irradiates the surface of the charged photosensitive drum 1 with light corresponding to image information to form the electrostatic latent image. For the optical scanner 3, for example, a laser scanning unit (LSU) that scans the photosensitive drum 1 by deflecting light emitted from a laser diode in a main scanning direction using a polygon mirror may be employed. For the optical scanner 3, a plurality of light emitting devices, for example, a bar-shaped optical scanner in which light emitting diodes (LEDs) are driven on/off corresponding to the image information and arranged in the main scanning direction may be employed.

The developing device 10 is as shown in FIGS. 1 to 6. The developing device 10 may be an integrated developing device including the photosensitive drum 1 and the developing roller 13. The developing roller 13 is installed in the developing chamber 220. The toner inside the developing chamber 220 is attached to the carrier by electrostatic force, and the carrier is attached onto a surface of the developing roller 13 by magnetic force of the developing roller 13. Thereby, a developer layer is formed on the surface of the developing roller 13. The developing roller 13 is exposed to the outside through the opening 201 to face the photosensitive drum 1. A thickness of a developer attached to the surface of the developing roller 13 is regulated by a regulation member 16, and the developer is conveyed, through the opening 201, to a developing area 9 in which the photosensitive drum 1 and the developing roller 13 face each other. The toner is moved from the developing roller 13 to the photosensitive drum 1 by a developing bias voltage applied between the developing roller 13 and the photosensitive drum 1, and a visible toner image is formed on the surface of the photosensitive drum 1.

A transfer roller 4 is an example of the transfer device configured to transfer the toner image formed on the photosensitive drum 1 to a printing medium P. The transfer roller 4 faces the photosensitive drum 1 to form a transfer nip. A transfer bias voltage is applied to the transfer roller 4, and a transfer electric-field is formed between the photosensitive drum 1 and the transfer roller 4. The toner image developed on the surface of the photosensitive drum 1 is transferred to the printing medium P by the transfer electric-field. The toner image transferred to the printing medium P is attached to the printing medium P by an electrostatic force. The fusing device 7 applies heat and pressure to fuse the toner image onto the printing medium P.

In a case where the toner in the developing device 10 runs out, the developer may be supplied from a developer container 100 to the developing device 10. The developer container 100 is provided with an outlet 102. The developer container 100 may be provided with a shutter 103 configured to optionally open or close the outlet 102. The outlet 102 and the developing device may be connected to each other by a developer supply member 104. Given such a configuration, the developer may be supplied from the developer container 100 to the developing device 10. Surplus developer of the developer in the developing device 10 is discharged from the developing device 10 through the developer outlet 251 described above.

Figure 8:
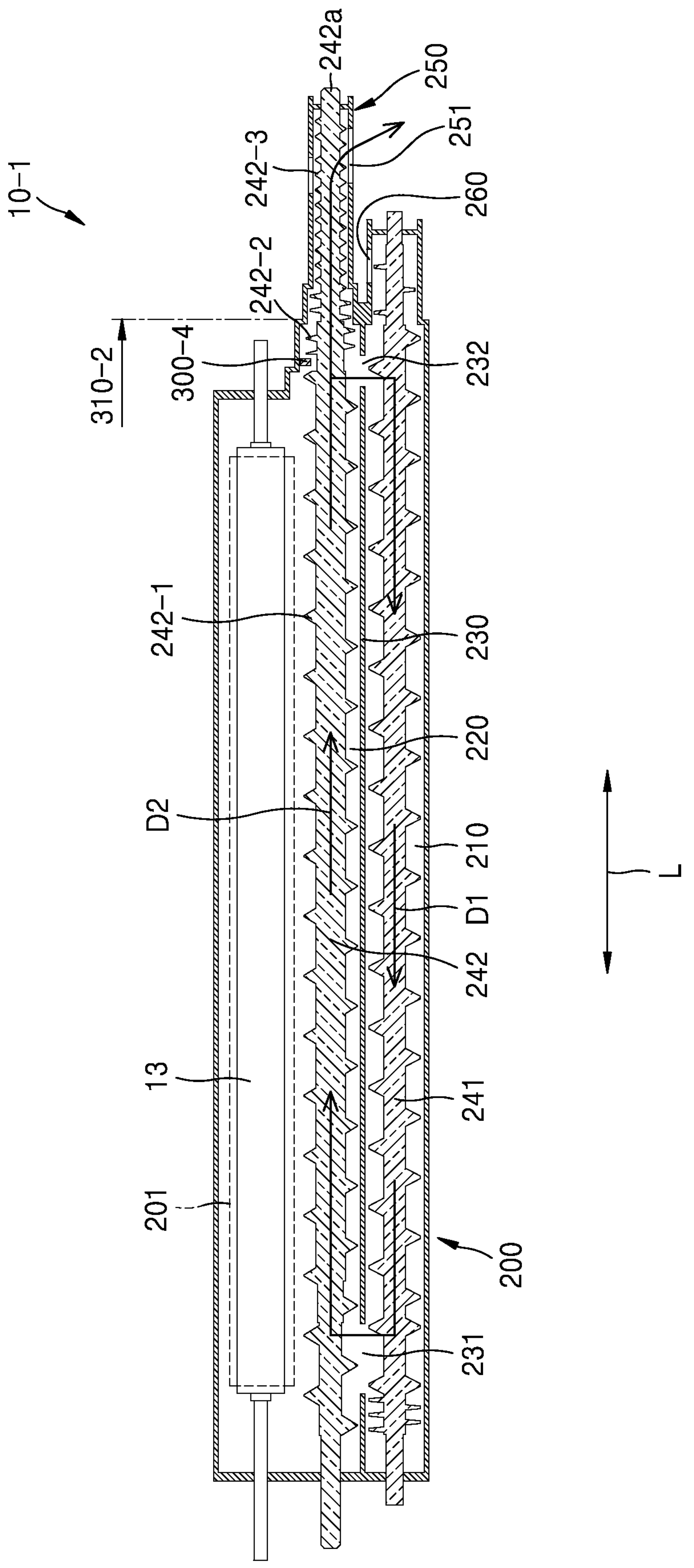
FIG. 8 is a schematic front configuration diagram of a developing device, according to an example.

FIG. 8 is a schematic front configuration diagram of a developing device 10-1, according to an example. Referring to FIG. 8, the developing device 10-1 according to the present example differs from the developing device 10 illustrated in FIG. 1 in that the developer discharge portion 250 extends from the developing chamber 220. Components performing the same functions as those of the example of the developing device 10 shown in FIG. 1 are denoted by the same reference numerals. The conveying members 240 installed in the agitation chamber 210 and the developing chamber 220 are referred to as the first conveying member 241 and the second conveying member 242, respectively. A direction in which a developer is conveyed by the first conveying member 241 is referred to as the first direction D1, and a direction in which the developer is conveyed by the second conveying member 242 is referred to as a second direction D2. A passage connecting the agitation chamber 210 to the developing chamber 220 is referred to as the first communication port 231, and a passage connecting the developing chamber 220 to the agitation chamber 210 is referred to as the second communication port 232. Hereinafter, descriptions will focus on the differences thereof.

Referring to FIG. 8, the first and second conveying members 241 and 242 convey the developer inside the agitation chamber 210 and the developing chamber 220 in the longitudinal axis L, respectively, in the first direction D1 and the second direction D2 to agitate a toner and a carrier. The first and second conveying members 241 and 242 may be, for example, augers having spiral blades. The developer may be circulated in the housing 200 along a circulation path formed by the agitation chamber 210—the first communication port 231—the developing chamber 220—the second communication port 232 by the first and second conveying members 241 and 242. Some of the developer conveyed in the second direction D2 in the developing chamber 220 is attached to the developing roller 13, and the toner in the developer is supplied to a photoconductor.

The developer supply port 260 may be provided in the agitation chamber 210 to supply the developer into the housing 200 of the developing device 10-1. The developer supply port 260 may be provided near an upstream end portion of the agitation chamber 210 with respect to the first direction D1. The developer discharge portion 250 extends from the developing chamber 220. The developer discharge portion 250 may extend from a downstream end portion of the developing chamber 220 with respect to a direction in which the developer is conveyed by the conveying member 240, for example, the second conveying member 242, that is the second direction D2. The developer discharge portion 250 may be located outside the second communication port 232.

The second conveying member 242 may include a first spiral portion 242-1 and a second spiral portion 242-2. The first spiral portion 242-1 is, for example, a forward spiral portion configured to convey the developer in the second direction D2. The second spiral portion 242-2 is a reverse spiral portion. The second spiral portion 242-2 has a spiral direction opposite to that of the first spiral portion 242-1. The developer is conveyed in a direction opposite to the second direction D2 by the second spiral portion 242-2. The second spiral portion 242-2 may be located on a downstream side of the developing chamber 220 with respect to the second direction D2. The second spiral portion 242-2 may be located on an upstream side of the developer discharge portion 250. The second spiral portion 242-2 may be located near the second communication port 232. The developer directed to the developer discharge portion 250 by the first spiral portion 242-1 is partially stagnated by the second spiral portion 242-2. Among the developer directed to the developer discharge portion 250 by the first spiral portion 242-1, the developer exceeding a conveying capacity in the reverse direction by the second spiral portion 242-2 is conveyed to the developer discharge portion 250 through the second spiral portion 242-2. The second conveying member 242 may further include a third spiral portion 242-3. The third spiral portion 242-3 is, for example, a forward spiral portion configured to convey the developer in the second direction D2, and has the same spiral direction as the first spiral portion 242-1. The third spiral portion 242-3 is located on a downstream side of the second spiral portion 242-2 with respect to the second direction D2. The third spiral portion 242-3 may be located in the developer discharge portion 250, and conveys the developer introduced into the developer discharge portion 250 through the second spiral portion 242-2 in the direction D2 to discharge the developer through the developer outlet 251.

The developing device 10-1 according to the present example includes a discharge regulation member 300-4 located on an upstream side of the developer discharge portion 250 to partially block a conveying path of the developer directed from the developing chamber 220 to the developer discharge portion 250. A conveying path 310-2 of surplus developer may be a path connecting the developing chamber 220 to the developer discharge portion 250. The conveying path 310-2 may partially include the developing chamber 220. The conveying path 310-2 may be a region close to the developer discharge portion 250 in the developing chamber 220.

Figure 9:
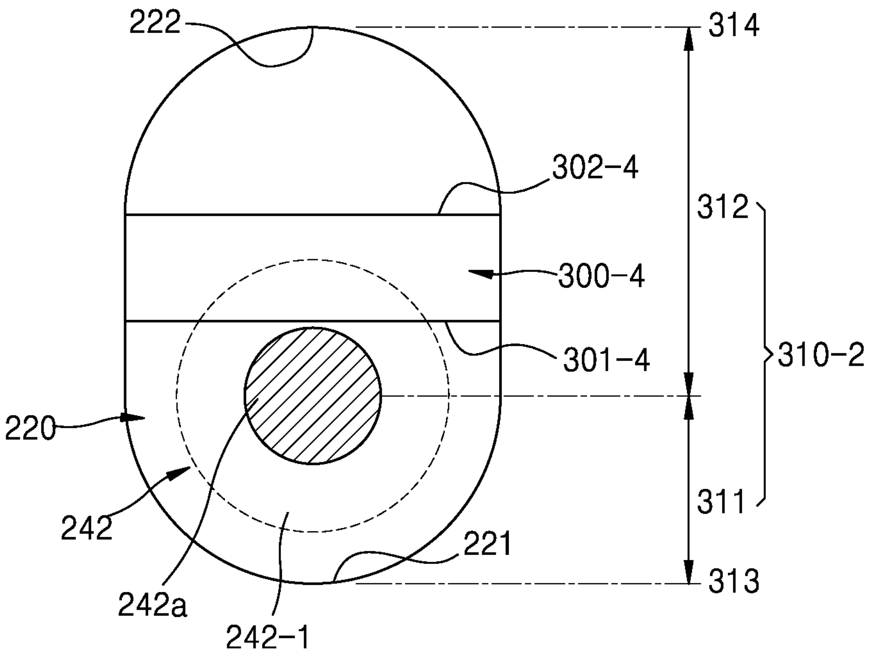
FIG. 9 illustrates a discharge regulation member, according to another example.

FIG. 9 illustrates the discharge regulation member 300-4, according to an example. Referring to FIG. 9, the discharge regulation member 300-4 may have a structure configured to open the lower path 311 of the conveying path 310-2 and partially block the upper path 312 of the conveying path 310-2 with respect to a shaft **242*a* of the second conveying member 242. For example, the discharge regulation member 300-4 may include a lower end portion 301-4 and an upper end portion 302-4 arranged apart from the bottom 313 and the upper wall 314 of the conveying path 310-2, respectively. The bottom 313 of the conveying path 310-2 may be a lower inner surface 221 of the developing chamber 220, for example. The upper wall 314 of the conveying path 310-2 may be an upper inner surface 22 of the developing chamber 220. As an example, the lower end portion 301-4 may be higher than the shaft 242*a* of the second conveying member 242. The upper end portion 302-4 may be higher than an outer circumference of the first spiral portion 242-1 of the second conveying member 242**.

Given such a configuration, the lower path 311 may be formed between the lower end portion 301-4 of the discharge regulation member 300-4 and the lower inner surface 221 of the developing chamber 220. The upper path 312 between the shaft **242*a* of the second conveying member 242 and the upper inner surface 222 of the developing chamber 220 is blocked as much as an area between the lower end portion 301-4 and the upper end portion 302-4 of the discharge regulation member 300-4. The upper path 312 partially blocked by the discharge regulation member 300-4** may be formed.

The discharge regulation member 300-4 may be located on an upstream side of the second spiral portion 242-2 of the second conveying member 242. The discharge regulation member 300-4 is located on an upstream side of the second spiral portion 241-2 of the second conveying member 242, and further stagnates a developer on the upstream side of the second spiral portion 241-2, thereby, preventing excessive discharge of the developer through the developer discharge portion 250 and at the same time allowing the developer to be easily circulated from the developing chamber 220 to the agitation chamber 210 through the second communication port 232. The discharge regulation member 300-4 may be located between the first spiral portion 242-1 and the second spiral portion 242-2 of the second conveying member 242. Given such a configuration, excessive discharge of the developer may be prevented by stagnating the developer on an upstream side of the second spiral portion 242-2 while facilitating the conveying of the developer in the second direction D2 by the first spiral portion 242-1.

The developer supplied to the agitation chamber 210 through the developer supply port 260 is conveyed in the first direction D1 by the first conveying member 241, and conveyed to the developing chamber 220 through the first communication port 231. The developer is conveyed in the second direction D2 by the first spiral portion 242-1 of the second conveying member 242 in the developing chamber 220. The developer is partially blocked by the discharge regulation member 300-4 on an upstream side of the developer discharge portion 250, for example, an upstream side of the second spiral portion 242-2 of the second conveying member 242. Developer stagnation occurs near the discharge regulation member 300-4, and the developer is circulated to the agitation chamber 210 through the second communication port 232. As an amount of the developer in the developing chamber 220 increases, some of the stagnant developer is pushed toward the developer discharge portion 250 through the lower path 311 and/or the upper path 312. Some of the developer passing through the discharge regulation member 300-4 is returned to the developing chamber 220 due to the developer stagnation formed by the second spiral portion 242-2 of the second conveying member 242, and circulated to the agitation chamber 210 through the second communication port 232. Among the developer passing through the discharge regulation member 300-4, surplus developer exceeding a reverse conveying capacity of the second spiral portion 242-2 is conveyed to the developer discharge portion 250, and discharged out of the housing 200 through the developer outlet 251. Therefore, the amount of the developer in the housing 200 may be maintained at an appropriate level.

In a case where a print speed of an image forming device increases and a pressure in the housing 200 and the developer discharge portion 250 connected thereto increases, a discharge speed of the developer through the developer outlet 251 increases, thereby causing excessive discharge of the developer. In the developing device 10-1 according to the present example, the upper path 312 is partially blocked by the discharge regulation member 300-4. Accordingly, even if the pressure in the housing 200 increases, excessive discharge of the developer may be prevented, thereby decreasing image defects such as image density reduction, auger marks or the like. In a case where the pressure in the housing 200 and the developer discharge portion 250 connected thereto decreases due to a low print speed of the image forming device, the amount of the developer discharged through the developer outlet 251 may be greatly decreased and thus the amount of the developer in the housing 200 may be greatly increased. In the developing device 10-1 according to the present example, since the lower path 311 of the conveying path 310-2 is open, the surplus developer may be easily discharged to the developer discharge portion 250 through the lower path 311 even if the pressure in the housing 200 is low. Accordingly, deterioration of the performance of the developer in the housing 200 and scattering of the toner may be decreased.

Figure 10:
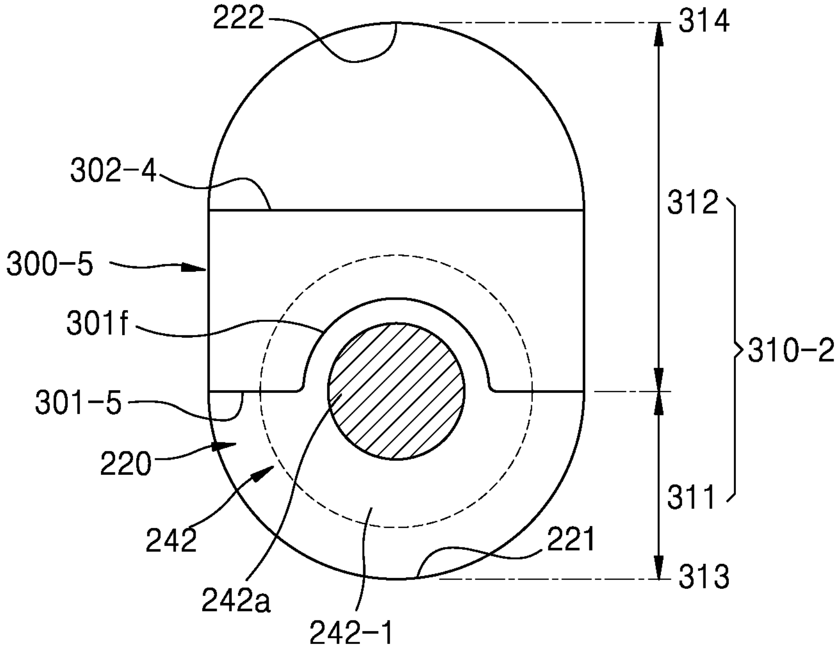
FIG. 10 illustrates a discharge regulation member, according to another example.

Shapes of the discharge regulation member are not limited to the example shown in FIG. 9. The discharge regulation member may have any shape capable of opening the lower path 311 and partially blocking the upper path 312. FIG. 10 illustrates a discharge regulation member 300-5, according to another example. Referring to FIG. 10, a lower end portion 301-5 of the discharge regulation member 300-5 may have a shape including a concave arc portion 301*f* higher than the shaft 242*a* of the second conveying member 242 and recessed upward such that the shaft 242*a* of the second conveying member 242 passes through.

Figure 11:
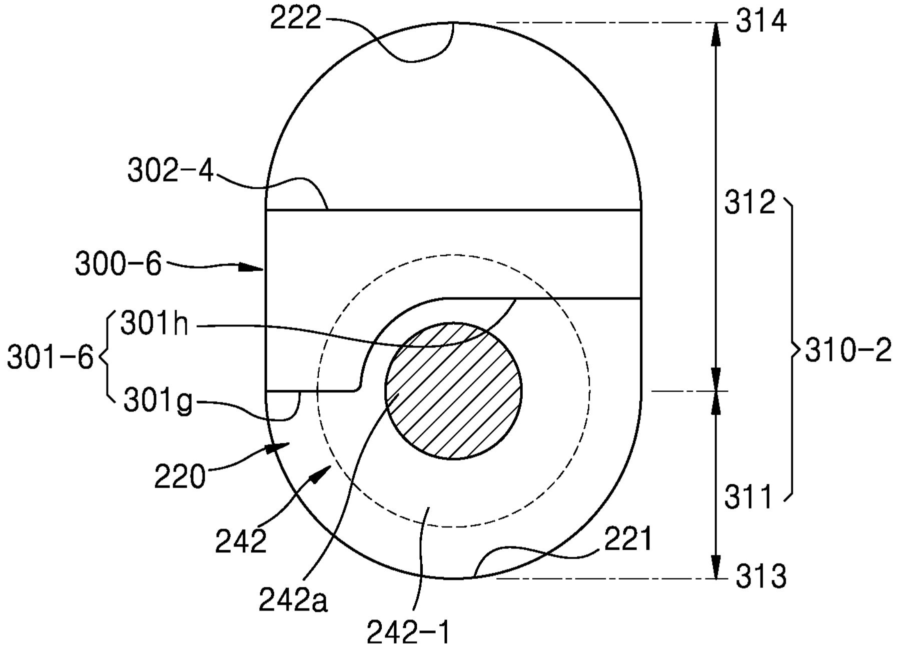
FIG. 11 illustrates a discharge regulation member, according to another example.

FIG. 11 illustrates a discharge regulation member 300-6, according to another example. Referring to FIG. 11, the discharge regulation member 300-6 according to the present example differs from the discharge regulation members 300-4 and 300-5 illustrated in FIGS. 9 and 10 in that the discharge regulation member 300-6 has a structure configured to partially block both the lower path 311 and the upper path 312. Hereinafter, descriptions will focus on the differences thereof.

Referring to FIG. 11, the discharge regulation member 300-6 includes a lower end portion 301-6 arranged apart from the bottom 313 of the conveying path 310-2. In order to partially block the lower path 311, a portion of the lower end portion 301-6 is lower than the shaft 242*a* of the second conveying member 242. The bottom 313 of the conveying path 310-2 may be the lower inner surface 221 of the developing chamber 220, for example. The lower end portion 301-6 may include a first lower end portion 301*g* lower than the shaft 242*a* of the second conveying member 242, and a second lower end portion 301*h* higher than the shaft 242*a* of the second conveying member 242. The first lower end portion 301*g* may be arranged apart from the lower inner surface 221 of the developing chamber 220, and may contact the lower inner surface 221 of the developing chamber 220. The second lower end portion 301*h* may be lower than an outer circumference of the first spiral portion 242-1 of the second conveying member 242. As a whole, the first lower end portion 301*g* and the second lower end portion 301*h* are arranged in a transverse direction orthogonal to a direction in which a developer is conveyed by the second conveying member 242, that is the second direction D2, and stepped in a vertical direction. Given such a configuration, the lower path 311 may be partially blocked by the lower end portion 301-6. The lower path 311 is partially blocked by a region between the first lower end portion 301*g* and the second lower end portion 301*h* of the discharge regulation member 300-6, and in a case where pressure in the housing 200 is low, excessive discharge of the developer through the lower path 311 may be prevented.

Figure 12:
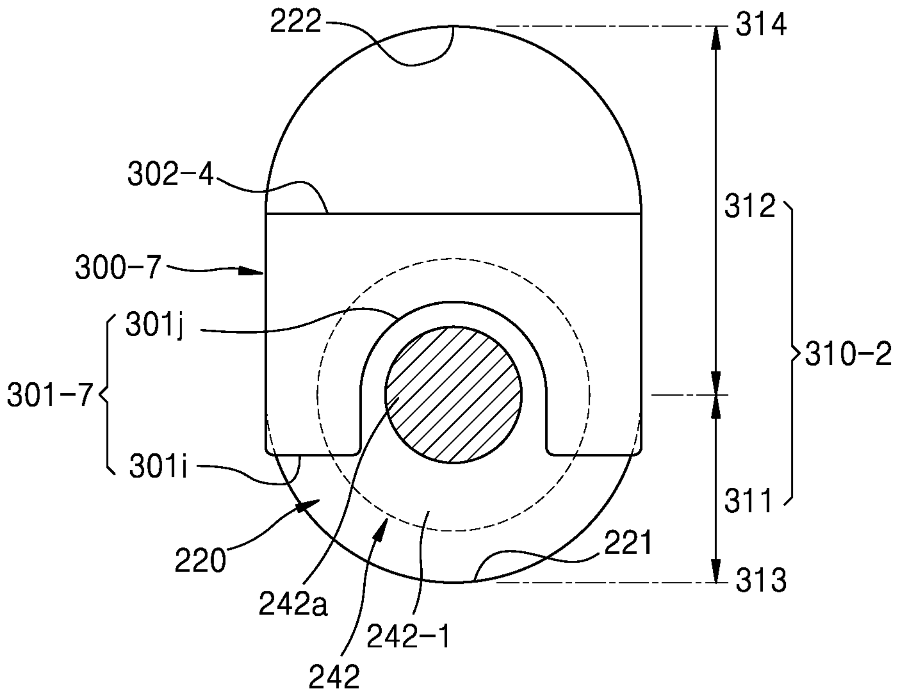
FIG. 12 illustrates a discharge regulation member, according to another example.

Shapes of the discharge regulation member are not limited to the example illustrated in FIG. 11. The discharge regulation member may have any shape capable of partially blocking the power path 311 and the upper path 312. FIG. 12 illustrates a discharge regulation member 300-7, according to another example. As illustrated in FIG. 12, the lower end portion 301-7 of the discharge regulation member 300-7 may include a first lower end portion 301*i* arranged apart from the bottom 313 of the conveying path 310-2, that is, the lower inner surface 221 of the developing chamber 220 and lower than the shaft 242*a* of the second conveying member 242, and an arc portion 301*j* recessed from the first lower end portion 301*i* such that the shaft 242*a* of the second conveying member 242 passes through.

Figure 13:
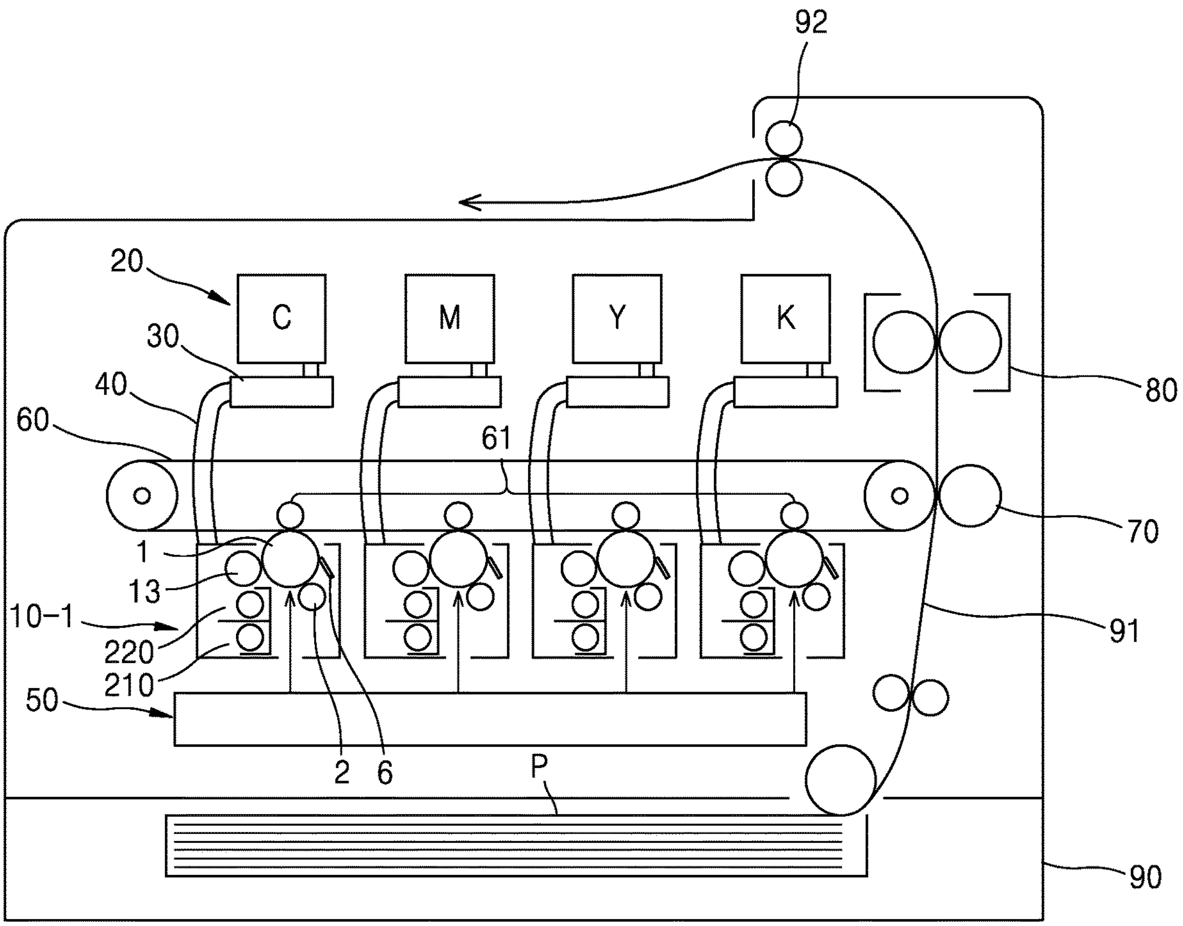
FIG. 13 is a schematic configuration diagram of an image forming device to which an example of the developing device shown in FIG. 8 is applied, according to an example.

FIG. 13 illustrates a schematic configuration diagram of an image forming device to which the developing device 10-1 is applied, according to an example. The image forming device according to the present example prints a colored image by an electro-photographic method. Referring to FIG. 13, the image forming device may include a plurality of developing devices 10-1, an optical scanner 50, a transfer device, and a fusing device 80.

The image forming device may further include a plurality of developer cartridges 20 in which a developer is accommodated. The plurality of developer cartridges 20 are connected to the plurality of developing devices 10-1, respectively, and the developer accommodated in the plurality of developer cartridges 20 are supplied to the plurality of developing devices 10-1, respectively. The plurality of developer cartridges 20 and the plurality of developing devices 10-1 may be individually replaced. As an example, the plurality of developing devices 10-1 may include four developing devices 10-1 to form toner images in four colors such as cyan C, magenta M, yellow Y, and black K. The plurality of developer cartridges 20 may include four developer cartridges 20 containing developers in four colors such as C, M, Y, and K to be supplied to the four developing devices 10-1. The developer cartridge 20 and the developing device 10-1 may be connected to each other by a developer supply pipe 40. A developer supply unit 30 may be provided between the developer supply pipe 40 and the developer cartridges 20. The developing device 10-1 may be the same as shown in FIGS. 8 to 12.

The optical scanner 50 scans the photosensitive drum 1 of the four developing devices 10-1 with four lights modulated in accordance with image information of each color to form an electrostatic latent image on the photosensitive drum 1. The electrostatic latent image formed on the photosensitive drum 1 is developed into visible toner images by the developing device 10-1. The developed toner images are intermediately transferred to an intermediate transfer belt 60 sequentially. The printing medium P loaded on a feeder 90 is conveyed along a feeding path 91 and conveyed between a transfer roller 70 and the intermediate transfer belt 60. The toner images intermediately transferred on the intermediate transfer belt 60 are transferred to the printing medium P by a transfer bias voltage applied to the transfer roller 70. In a case where the printing medium P passes through the fusing device 80, the toner images are fixed onto the printing medium P by heat and pressure. The fused printing medium P is discharged by a discharge roller 92.

In a case where the developer accommodated in the developer cartridges 20 runs out, the developer cartridge 20 may be replaced with a new developer cartridge 20, or the developer cartridges 20 may be filled with a new developer. Among the developer in the developing device 10-1, surplus developer is discharged out of the developing device 10-1 through the developer outlet 251 described above.

It should be understood that examples described herein should be considered in a descriptive sense only and not for purposes of limitation Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A developing device comprising:
- a housing;
- a conveying member to circulate a developer in the housing;
- a developer discharge portion extending from one end portion of the housing to form a passage through which surplus developer is discharged from the housing; and
- a discharge regulation member located on an upstream side of the developer discharge portion, with respect to a conveying direction in which the developer is conveyed to the developer discharge portion by the conveying member, to partially block a conveying path of the developer, the discharge regulation member provided with a lower end portion and an upper end portion arranged apart from a bottom and an upper wall of the conveying path, respectively,
- wherein the lower end portion includes a first lower end portion arranged apart from the bottom of the conveying path and lower than a shaft of the conveying member, and a concave arc portion recessed upward from the first lower end portion such that the shaft passes through the concave arc portion, and is apart from the conveying member and radially extends at least to a position radially between the shaft and an outer circumference of a spiral portion of the shaft to have at least a portion of the lower end portion to be overlapped with the spiral portion of the shaft in a radial direction when viewed along an axial direction of the shaft.

2. The developing device of claim 1, wherein the conveying member comprises the shaft and a first spiral portion formed on an outer circumference of the shaft to convey the developer in the conveying direction, and
- the upper end portion is higher than an outer circumference of the first spiral portion.

3. The developing device of claim 2, wherein the lower end portion is higher than the shaft.

4. The developing device of claim 2, wherein the first lower end portion is lower than the shaft.

5. The developing device of claim 2, wherein the conveying member comprises a second spiral portion having a spiral direction opposite to that of the first spiral portion to stagnate the developer directed to the developer discharge portion, and
- the discharge regulation member is located on an upstream side of the second spiral portion with respect to a direction in which the developer is conveyed by the first spiral portion.

6. The developing device of claim 5, wherein the discharge regulation member is located between the first spiral portion and the second spiral portion.

7. The developing device of claim 1, wherein the housing comprises an agitation chamber and a developing chamber separated by a partition wall and communicating with each other through first and second communication ports provided at both end portions of the partition wall,
- the conveying member comprises first and second conveying members located in the agitation chamber and the developing chamber, respectively, to convey the developer, and
- the developer discharge portion extends from a downstream end portion of the agitation chamber with respect to a direction in which the developer is conveyed by the first conveying member.

8. The developing device of claim 7, further comprising a toner concentration sensor to detect a toner concentration of the agitation chamber,
- wherein the discharge regulation member is located on a downstream side of the toner concentration sensor with respect to the direction in which the developer is conveyed by the first conveying member.

9. The developing device of claim 1, wherein the housing comprises an agitation chamber and a developing chamber separated by a partition wall and communicating with each other through first and second communication ports provided at both end portions of the partition wall, and
- the conveying member comprises first and second conveying members located in the agitation chamber and the developing chamber, respectively, to convey the developer, and
- the developer discharge portion extends from a downstream end portion of the developing chamber with respect to a direction in which the developer is conveyed by the second conveying member.

10. A developing device comprising:
- an agitation chamber and a developing chamber separated by a partition wall and communicating with each other through first and second communication ports provided at both end portions of the partition wall;
- a developing roller installed in the developing chamber;
- a conveying member located in the agitation chamber and the developing chamber to circulate a developer;
- a developer discharge portion extending from either the agitation chamber or the developing chamber to form a discharge passage for surplus developer; and
- a discharge regulation member to partially block a conveying path of the developer by being located on an upstream side of the developer discharge portion with respect to a conveying direction in which the developer is conveyed to the developer discharge portion by the conveying member, the discharge regulation member to open a lower path of the conveying path and partially block, at least at a position apart from a shaft of the conveying member and radially between the shaft and an outer circumference of a spiral portion of the shaft, an upper path of the conveying path with respect to the shaft of the conveying member, wherein the discharge regulation member includes a lower end portion with a first lower end portion arranged apart from a bottom of the conveying path and lower than the shaft, and a concave arc portion recessed upward from the first lower end portion such that the shaft passes through the concave arc portion, and wherein at least a portion of the discharge regulation member overlaps with the spiral portion of the shaft in a radial direction when viewed along an axial direction of the shaft.

11. The developing device of claim 10, wherein the discharge regulation member partially blocks the lower path of the conveying path.

12. The developing device of claim 10, wherein the discharge regulation member comprises an upper end portion and the lower end portion arranged apart from the bottom and an upper wall of the conveying path, respectively, and the conveying member comprises the shaft and a first spiral portion formed on an outer circumference of the shaft to convey the developer in the conveying direction, and the upper end portion is higher than an outer circumference of the first spiral portion, and the lower end portion of the discharge regulation member is generally higher than the shaft of the conveying member and lower than an outer circumference of the first spiral portion, and the lower end portion has a shape including a concave arc portion configured to partially surround the shaft from above.

13. The developing device of claim 10, further comprising a toner concentration sensor to detect toner concentration of the agitation chamber, wherein the developer discharge portion extends from the agitation chamber, and the discharge regulation member is located on a downstream side of the toner concentration sensor with respect to a direction in which the developer is conveyed in the agitation chamber.

14. The developing device of claim 13, wherein the conveying member comprises a first spiral portion to convey the developer to the developer discharge portion and a second spiral portion having a spiral direction opposite to that of the first spiral portion to stagnate the developer directed to the developer discharge portion, and is located in the agitation chamber, and the discharge regulation member is located between the toner concentration sensor and the second spiral portion.

15. The developing device of claim 10, wherein the developer discharge portion extends from the agitation chamber, the conveying member comprises a first spiral portion located in the agitation chamber to convey the developer to the developer discharge portion and a second spiral portion located in the agitation chamber having a spiral direction opposite to that of the first spiral portion to stagnate the developer directed to the developer discharge portion, and the discharge regulation member is located between the first spiral portion and the second spiral portion with respect to a direction in which the developer is conveyed by the first spiral portion.

16. The developing device of claim 10, wherein the upper path is formed between the shaft and an upper inner surface of the agitation chamber, and the lower path is formed between a lower end portion of the discharge regulation member and a lower inner surface of the agitation chamber.

* * * * *